(12) United States Patent
Bustos García et al.

(10) Patent No.: US 7,878,541 B2
(45) Date of Patent: Feb. 1, 2011

(54) MULTI-ADAPTIVE AIRBAG

(75) Inventors: Alfonso Bustos García, Valladolid (ES); Joana Francisca Tavares Da Silva Vinhas, Valladolid (ES)

(73) Assignee: Dalphi Metal España S.A., Madrid (ES)

( * ) Notice: Subject to any disclaimer, the term of this patent is extended or adjusted under 35 U.S.C. 154(b) by 94 days.

(21) Appl. No.: 12/157,445

(22) Filed: Jun. 10, 2008

(65) Prior Publication Data

US 2009/0001696 A1 Jan. 1, 2009

(30) Foreign Application Priority Data

Jun. 29, 2007 (EP) .................................. 07380194

(51) Int. Cl.
*B60R 21/23* (2006.01)
(52) U.S. Cl. .................................. 280/743.2
(58) Field of Classification Search ............. 280/743.1, 280/743.2
See application file for complete search history.

(56) References Cited

U.S. PATENT DOCUMENTS

| | | | | |
|---|---|---|---|---|
| 5,249,825 A * | 10/1993 | Gordon et al. | ........... | 280/728.1 |
| 5,362,101 A * | 11/1994 | Sugiura et al. | ........... | 280/743.2 |
| 5,613,708 A * | 3/1997 | Bleider et al. | ............ | 280/743.2 |
| 5,639,118 A * | 6/1997 | Rhule et al. | .............. | 280/743.1 |
| 5,678,858 A * | 10/1997 | Nakayama et al. | ........ | 280/743.2 |
| 5,813,696 A * | 9/1998 | Hill | .......................... | 280/743.2 |
| 5,997,037 A * | 12/1999 | Hill et al. | .................. | 280/743.2 |
| 6,254,130 B1 * | 7/2001 | Jayaraman et al. | ....... | 280/743.2 |
| 6,334,627 B1 * | 1/2002 | Heym et al. | .............. | 280/743.2 |
| 6,616,184 B2 * | 9/2003 | Fischer | .................... | 280/743.2 |
| 6,722,691 B1 * | 4/2004 | H.ang.land et al. | ....... | 280/730.1 |
| 6,793,245 B2 * | 9/2004 | Luders et al. | ............. | 280/743.1 |
| 6,808,205 B2 * | 10/2004 | Hawthorn et al. | ........ | 280/743.2 |
| 6,918,614 B2 * | 7/2005 | Ryan | ........................ | 280/743.2 |
| 6,932,384 B2 * | 8/2005 | Waid et al. | .................. | 280/739 |
| 7,021,657 B2 * | 4/2006 | Kassman et al. | ......... | 280/743.2 |
| 7,059,634 B2 * | 6/2006 | Bossecker et al. | ........... | 280/739 |
| 7,134,691 B2 * | 11/2006 | Dunkle et al. | ............ | 280/743.2 |
| 7,188,862 B2 * | 3/2007 | Webber | ...................... | 280/729 |

(Continued)

FOREIGN PATENT DOCUMENTS

DE 195 06 886 A1 8/1996

(Continued)

OTHER PUBLICATIONS espacenet English abstract of DE 195 06 886 A1.

(Continued)

*Primary Examiner*—Paul N Dickson
*Assistant Examiner*—Nicole Verley
(74) *Attorney, Agent, or Firm*—Ladas & Parry LLP

(57) ABSTRACT

An airbag module to protect the automobile occupant, which includes an inflatable bag (11) from the gas that is produced by a generator when a dangerous situation to the occupant is detected, which includes a number of internal straps (15, 17 and 19) with different lengths and with each having a predetermined resistance to traction, which are joined at their ends to two areas (21 and 23) of the bag (11), limiting its deployment in the direction of the occupant. The length and resistance to traction of these straps are calibrated so that they break in succession during the deployment of the bag (11) until it reaches the occupant.

8 Claims, 2 Drawing Sheets

U.S. PATENT DOCUMENTS

| | | | |
|---|---|---|---|
| 7,195,281 B2 * | 3/2007 | Williams et al. | 280/743.2 |
| 7,350,807 B2 * | 4/2008 | Schneider et al. | 280/732 |
| 7,377,548 B2 * | 5/2008 | Bauer et al. | 280/743.2 |
| 7,543,848 B2 * | 6/2009 | Webber et al. | 280/735 |
| 7,552,942 B2 * | 6/2009 | Fischer et al. | 280/743.2 |
| 7,658,408 B2 * | 2/2010 | Zofchak et al. | 280/743.2 |
| 2005/0225065 A1 * | 10/2005 | Fujll | 280/743.2 |
| 2008/0252054 A1 * | 10/2008 | Kim et al. | 280/743.2 |

FOREIGN PATENT DOCUMENTS

| | | |
|---|---|---|
| DE | 297 07 162 U1 | 6/1997 |
| GB | 2 364 674 A | 2/2002 |
| WO | 00/41919 | 7/2000 |

OTHER PUBLICATIONS espacenet English abstract of DE 297 07 162 U1.

* cited by examiner

MULTI-ADAPTIVE AIRBAG

INVENTION FIELD

This invention refers to an airbag module for protecting a motor vehicle occupant, which can self-adapt to different the positions and sizes of the vehicle's occupant.

INVENTION BACKGROUND

Airbag modules with dual operation are known in the above technique; i.e. airbag modules that can adopt two different states of operation from the characteristics of the vehicle's occupant when they are deployed in case of vehicle impact. For example, a first state with a small volume to protect passengers located in a forward position and a second state with a higher volume to protect passengers located in a back position.

The WO 2006/006904 patent application describes an airbag module with a double loading generator that allows the damage to be reduced that is suffered by a potentially incorrectly positioned occupant, through an active device that determines (non) activation of the second generator load based upon the degree of tension of a strap located between two opposite parts of the bag. If during its deployment, the bag quickly reaches the occupant, the strap does not tighten, and therefore the second load is not activated and consequently the bag remains in the first state. Otherwise, the strap tightens, which causes the activation of the second load, which allows the bag to reach the second state.

The U.S. Pat. No. 6,808,205 patent describes an airbag module that incorporates a combination of fabric straps sewn at different locations of the bag, which allow a deployment that is differentiated into two states.

The U.S. Pat. No. 7,111,871 patent describes an airbag module for protecting the vehicle occupant in case of a front impact, where the mentioned two states are achieved with a dual loading generator and a two-volume bag. The first state is achieved by firing the first generator load, with which the bag deploys to a small volume, assisted by some moving straps inside the bag that hold it back. The second state is achieved by firing the two generator loads, with which the bag is filled completely. At the same time, the straps move by pressure, allowing the bag to be inflated to a large volume. The decision to fire one or both generator charges takes place on the basis of the values of pre-determined variables obtained through sensor devices. For example, this decision may be made depending on the seat's position, such that the small volume is deployed if the seat is in a more forward position and the large volume if the seat is in a halfway or back position.

Those airbag modules have the basic problem that the degree of adaptiveness to the occupant is limited, since only two states of bag filling are provided. In addition, one of them requires detection mechanisms of the occupant's position, which increases its complexity and cost.

Now, the automobile industry is constantly demanding airbag modules with more capacity to adapt to the size and position of the occupant, and this invention aims to satisfy that demand.

SUMMARY OF THE INVENTION

One purpose of this invention is to provide an airbag module for an automobile capable of adapting to different positions and sizes of the occupant. Each size, occupant's position and type of impact, need a specific solution, the present invention allowing to provide a unique product adapted to each particular case.

Another purpose of this invention is to provide an airbag module for an automobile capable of achieving two or more bag deployment volumes, getting different energy absorptions during the occupant's load.

Another purpose of this invention is to provide an airbag module for an automobile that has a self-adaptive compartment based upon the position and size of the occupant without the need for any detection mechanism of these factors.

Another purpose of this invention is to provide an airbag module for an automobile that allows it to absorb the tolerances of other passive safety systems that may involve changes to the anticipated position of the occupant. Among those systems it is worth mentioning the single frame programmed deformation, the seats, the seatbelts and the collapsible steering columns that may cause variations in the position of the occupant within a given adjustment range.

That and other purposes are achieved by providing an airbag module to protect the automobile occupant, which includes an inflatable bag from the gas that is produced by a generator when a dangerous situation to the occupant is detected, which includes a number of internal straps with different lengths and with each having a predetermined resistance to traction, which are joined at their ends to two areas of the bag, limiting its deployment in the direction of the occupant. The length and resistance to traction of these straps are calibrated so that they break in succession during the deployment of the bag until it reaches the occupant.

In one execution of the invention, the bag is configured to protect the occupant from a front impact. Thus a self-adaptive airbag module is achieved for the driver or passenger.

In another execution of the invention, the bag is configured to protect the occupant from a side impact. Thus a self-adaptive side airbag module is achieved.

In another execution of the invention, straps are used with a weakened section for better control of the energy dissipated during their breaking. Thus an improved self-adaptive airbag module is achieved.

Other characteristics and advantages of this invention will be highlighted in the detailed description that follows, which is for the purpose of illustration but not limitation, regarding its purpose in relation to the accompanying drawings.

DETAILED DESCRIPTION OF THE INVENTION

Figure 1A:
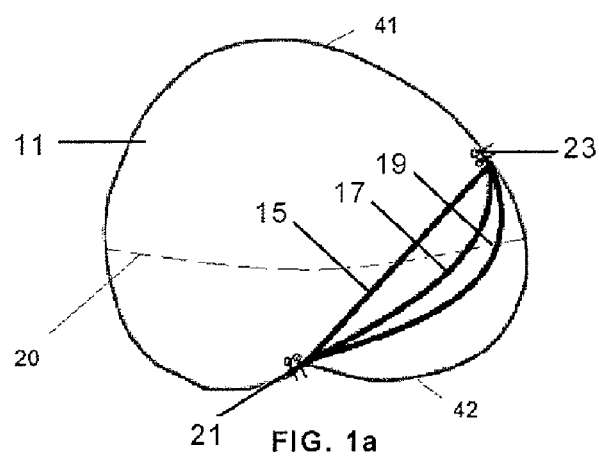
FIGS. 1a, 1b and 1c are schematic views of the deployment of the bag from an airbag module according to this invention.
Figure 1B:
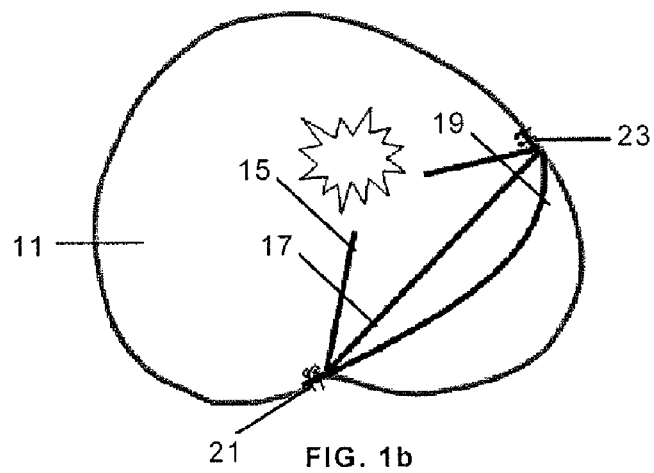
Figure 1C:
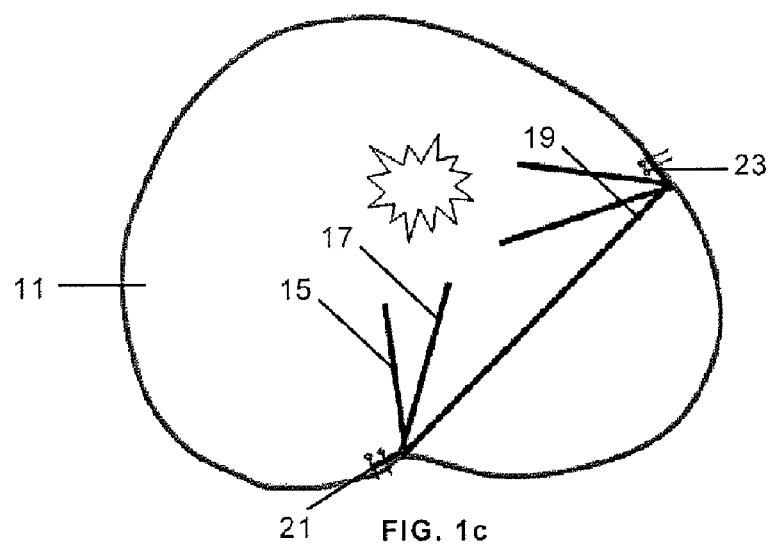

Following the execution illustrated in FIGS. 1a, 1b and 1c, it can be seen that bag 11 of an airbag module according to this invention, incorporates three straps 15, 17 and 19 of different lengths, which are fixed on two areas 21 and 23 of the same bag, through fabric seams of variable configuration, a pressure-temperature setting or any other type of setting that is appropriate.

As shown in FIG. 1a, the bag (11) is formed by an upper panel (41) and a lower panel (42) joined through a peripheral seam 20. In one aspect of the invention the bag (11) is configured to deploy from the front, with the upper panel (41) contacting the occupant upon deployment; one of the joined areas (21 and 23) of the internal straps (15, 17, and 19) to the bag (11) is located on the upper panel (41), and the other area is located on the lower panel (42). Accordingly, references to the upper and lower panels of the airbag (11) have been marked as 41 and 42, respectively. It is noted that reference numerals 41 and 42 may also refer to front or back panels of the airbag (11), depending on the position of the airbag (11). See, e.g., FIG. 2a (discussed in further detail below).

The other components of the airbag module are conventional, and it is therefore not necessary to represent them in said Figures.

FIG. 1a shows a first state of bag 11 deployment, where its volume is limited by strap 15 with the smallest length, which is stretched at its ends as a result of the internal pressure of bag 11 exercised by the gas provided by the generator. The other straps 17 and 19, which are longer, are not under tension in this first state.

FIG. 1b shows a second state of bag 11 deployment, where after breaking strap 15 with the smallest length, its volume is limited by strap 17 with an intermediate length, which is stretched at its ends. Strap 19, with the longest length, is not under tension in this second state.

FIG. 1c shows a third state of bag 11 deployment, where after breaking strap 17 with the intermediate length, its volume is limited by strap 19 with a longer length.

If during bag 11 deployment, it had reached the occupant before the tearing away of straps 15, 17 and 19, their tearing away would logically not occur, since those straps can be only be stretched as long as bag 11 does not reach the occupant.

The number of straps 15, 17 and 19, the location of their setting areas 21 and 23 to bag 11, as well as their geometry and mechanical properties, are the variables to be taken into consideration in order to predetermine the self-adaptive behaviour of the bag of the airbag module in question.

An important characteristic of this invention is that the tearing away of straps 15, 17 and 19 must take place in a direction that is sensitively perpendicular to the traction force exercised by the gas pressure, and therefore without substantially modifying their length when breaking.

Another important characteristic of this invention is that the tearing away of straps 15, 17 and 19 constitutes an energy absorption mechanism that positively contributes to the self-adaptive behaviour of the bag.

Another important characteristic of this invention is that the airbag module, as per its invention, can be an airbag module for a front, oblique or side collision.

Figure 2A:
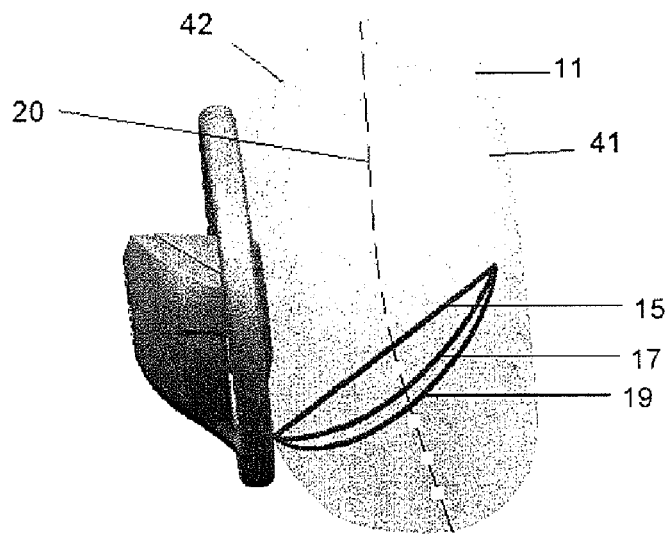
FIGS. 2a and 2b are perspective views of the deployment of the bag from a driver's airbag module according to this invention.
Figure 2B:
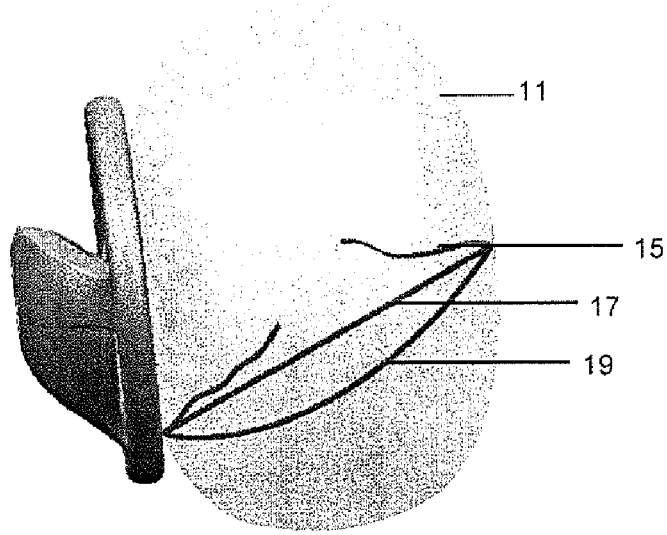

FIGS. 2a and 2b illustrate the deployment of a driver airbag module, and the limitation of bag deployment in the direction of the occupant can be observed, which is provided by straps 15, 17 and 19.

This invention is also applicable to passenger and side airbag modules. Upon viewing FIGS. 2a and 2b, an expert in this area will easily understand the application of the invention to these types of airbag modules. In the case that the bag of the airbag modules is formed by two panels, one of the joined areas of straps 15, 17 and 19 will preferably be located in each of them.

In a preferable execution of the invention, fabric straps 15, 17 and 19 with appropriate mechanical characteristics are used, in particular the dtex No. and the direction of the warp and weft.

In a preferable execution of the invention, rectangular straps 15, 17 and 19 are used.

Figure 3:
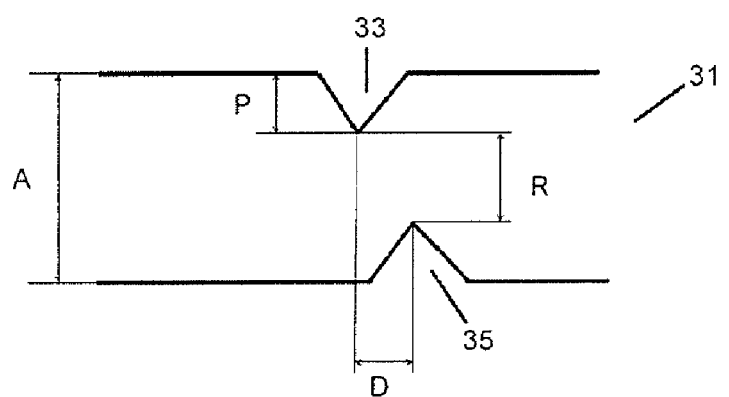
FIG. 3 is a plan view of a strap section used in an airbag module according to this invention, with two measurements to predetermine the location where it will break during the bag deployment.

In another preferred execution, straps 15, 17 and 19 include a section 31, shown in FIG. 3, rectangular and width A with two measurements 33 and 35 of a triangular shape and depth of P, with axes displaced at a distance D, determining a reduced width area R on the straps. The proper selection of the sizes mentioned in that section 31 allows the energy dissipated by straps 15, 17 and 19 to be controlled during their breaking.

In a specific example of execution of the invention, 3 straps measuring 400, 450 and 500 mm in length and 100 mm in width will be used, each of them with two measurements 33 and 35 of a triangular shape and depth of 30 mm, with axes displaced at a distance of 80 mm.

In another preferable execution of the invention straps 15, 17, 19 are used formed by two pieces joined by seams with determined characteristics of type of seam, type of thread and stitch density that allow predetermining their tensile strength and controlling the dissipated energy of the straps 15, 17, 19 during their breakage.

In a preferable execution of the invention, straps 15, 17 and 19 with the same characteristics are used, except for their length. Thus, its resistance to traction will be the same and it will be selected based upon the change in the planned traction force during the deployment of bag 11.

The main advantage of this invention is that an airbag module is achieved that behaves by self-adaptation, by deploying the required bag volume from the position and size of the occupant.

Another advantage of this invention is that OOP ("Out of Position") behaviour of the airbag module is improved, since the breaking of the straps contributes to the absorption of the energy from the bag deployment, reducing damage to the occupant.

Another advantage of this invention is that the straps incorporated into the bag allow the direction and guidance of its deployment to be improved.

Another advantage of this invention is that the straps incorporated into the bag optimise the contact surface with the occupant.

Another advantage of this invention is that it allows the bag filling volume to be controlled without the need for using dual state generators.

Although several executions of the invention have been described and represented, modifications included within the scope of the invention may be introduced, and the scope must not be considered as being limited to said execution, but rather to the contents of the following claims:

The invention claimed is:

1. An airbag module to protect an automobile occupant, comprising:
   an inflatable bag (11), inflatable from gas that is produced by a generator when a dangerous situation to the occupant is detected;
   a number of internal straps (15, 17 and 19) with different lengths, each having a predetermined resistance to traction, wherein each of said internal straps comprises a first end and a second end, all of said internal straps being joined at their first end, wherein the joined first ends are attached to a first point (21) of the bag, and all of said internal straps being joined at their second end, wherein the joined second ends are attached to a second point (23) of the bag (11), limiting deployment of the bag (11) in the direction of the occupant,
   wherein a length and resistance to traction of said internal straps are calibrated so that said internal straps break in succession during deployment of the bag (11) until the bag (11) reaches the occupant.

2. An airbag module according to claim 1, wherein a number of said internal straps (15, 17 and 19) is between 2 and 5.

3. An airbag module according to claim 1, wherein a traction force of said internal straps (15, 17 and 19) is predetermined based upon its geometry and mechanical characteristics of a material of said internal straps.

4. An airbag module according to claim 3, wherein a number of said internal straps (15, 17 and 19) have a rectangular shape and include at least one shape (33 and 35) reducing their width.

5. An airbag module according to claim 4, wherein said internal straps (15, 17 and 19) each include an area (31) with two shapes (33 and 35) on each of its edges with its axes displaced between each other.

6. An airbag module according to claim 1, wherein said bag (11) is formed by an upper panel (41) and a lower panel (42) joined through a peripheral seam 20, said bag (11) is configured to deploy from the front, with said upper panel (41) contacting the occupant during deployment, and one of the joined areas (21 and 23) of said internal straps (15, 17 and 19) to said bag (11) is located on said upper panel (41) and the other area is located on said lower panel (42).

7. An airbag module according to claim 1, wherein said internal straps (15, 17, 19) are formed by two pieces joined by seams, their tensile strength being predetermined by characteristics of said seams.

8. An airbag module according to claim 1, wherein said bag (11) is formed by a front panel (41) and a back panel (42), joined through a peripheral seam 20, said bag (11) is configured to deploy from a side of a driver, with said front panel (41) contacting the occupant during deployment, and one of the first and second points (21 and 23) of said bag (11) is located on said front panel (41) and the other of the first and second points is located on said back panel (42).

* * * * *